United States Patent
Solvang

(10) Patent No.: US 8,848,030 B2
(45) Date of Patent: Sep. 30, 2014

(54) METHOD AND SYSTEM FOR DETERMINING A DIRECTION BETWEEN A DETECTION POINT AND AN ACOUSTIC SOURCE

(75) Inventor: Audun Solvang, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 12/982,092

(22) Filed: Dec. 30, 2010

(65) Prior Publication Data

US 2011/0157300 A1 Jun. 30, 2011

Related U.S. Application Data

(60) Provisional application No. 61/282,206, filed on Dec. 30, 2009.

(30) Foreign Application Priority Data

Dec. 30, 2009 (NO) .................................. 20093605

(51) Int. Cl.
| | |
|---|---|
| H04N 7/15 | (2006.01) |
| H04N 7/14 | (2006.01) |
| H04R 3/00 | (2006.01) |
| G01S 3/808 | (2006.01) |
| H04R 1/40 | (2006.01) |

(52) U.S. Cl.
CPC ................. *H04R 3/005* (2013.01); *H04N 7/15* (2013.01); *H04R 1/406* (2013.01); *H04N 7/142* (2013.01); *H04R 2201/403* (2013.01); *G01S 3/8083* (2013.01)
USPC ...................................................... 348/14.16

(58) Field of Classification Search
USPC ...................................................... 348/14.16
See application file for complete search history.

(56) References Cited

U.S. PATENT DOCUMENTS

| 8,358,563 B2 * | 1/2013 | Hiroe ........................... 367/125 |
| 2002/0048376 A1 | 4/2002 | Ukita |

(Continued)

FOREIGN PATENT DOCUMENTS

| CN | 1292985 A | 4/2001 |
| EP | 2 063 419 A1 | 5/2009 |
| JP | 2006-304124 A | 11/2006 |

OTHER PUBLICATIONS

Extended European Search Report issued Oct. 22, 2013, in Patent Application No. 10841340.2.

(Continued)

*Primary Examiner* — Duc Nguyen
*Assistant Examiner* — Theodore Ndje
(74) *Attorney, Agent, or Firm* — Lempia Summerfield Katz LLC

(57) ABSTRACT

A method including: receiving acoustic signals originating from an acoustic source at a first pair of microphone elements, arranged symmetrically about a detection point; calculating, with a processor device, a cross correlation of signals provided by the first pair of microphone elements, resulting in a first cross correlation signal; receiving the acoustic signals originating from the acoustic source at a second pair of microphone elements, arranged symmetrically about the detection point; calculating, with the processor device, a cross correlation of signals provided by the second pair of microphone elements, resulting in a second cross correlation signal; and calculating, with the processor device, a direction between the detection point and the acoustic source based on a convolution of the first cross correlation signal by the second cross correlation signal.

20 Claims, 7 Drawing Sheets

(56) References Cited

U.S. PATENT DOCUMENTS

| | | |
|---|---|---|
| 2004/0240680 A1 | 12/2004 | Rui et al. |
| 2006/0215850 A1 | 9/2006 | Rui et al. |
| 2006/0227977 A1 | 10/2006 | Rui et al. |
| 2006/0239471 A1* | 10/2006 | Mao et al. ............ 381/92 |
| 2011/0019835 A1 | 1/2011 | Schmidt et al. |

OTHER PUBLICATIONS

Combined Chinese Office Action and Search Report issued Sep. 6, 2013, in Chinese Patent Application No. 201080060305.1 with English translation of category of cited documents.

\* cited by examiner

METHOD AND SYSTEM FOR DETERMINING A DIRECTION BETWEEN A DETECTION POINT AND AN ACOUSTIC SOURCE

CROSS-REFERENCE TO RELATED APPLICATIONS

The present application claims the benefit of U.S. Provisional Application Ser. No. 61/282,206, filed Dec. 30, 2009, the entire contents of which are hereby incorporated by reference. The present application also claims the benefit of priority under 35 U.S.C. §119 to Norwegian Patent Application No. NO20093605, filed Dec. 30, 2009, the entire contents of which are hereby incorporated by reference.

TECHNICAL FIELD

Embodiments described herein relate to determining the direction between a detection point and an acoustic source, and in particular to a method and system of determining the direction between a detection point and an active speaker, such as a speaking participant in a video conference.

BACKGROUND

Video teleconferencing systems are used to create virtual meetings between two or more people, or two or more groups of people, located in separate locations.

Determining the direction between a detection point and an acoustic source is useful in video conferencing. Such determining may, for example, be used in automatic camera pointing in a video conferencing system. A typical situation at a video conference end-point (the terminal equipment at a video conferencing site) is a meeting room with a number of conference participants sitting in front of or around a table watching the display device of the end-point, while a camera positioned near the display device is capturing a view of the meeting room. If there are many participants in the room, it may be difficult for those who are watching the view of the meeting room at a far end side to determine the speaker or to follow a discussion between several speakers. Thus, it would be preferable to localize the active speaker in the room, and automatically point and direct the camera onto that participant. In addition, the camera may be zoomed in order to obtain an appropriate view of the speaker.

One example of audio source localization in the background art is shown in U.S. Pat. No. 5,778,082, the entire contents of which are incorporated by reference. U.S. Pat. No. 5,778,082 describes, i.e., a method and a system using a pair of two spatially separated microphones to obtain the direction of an audio source. By detecting the beginning of the respective signals of the microphones representing the sound of the audio source, the time delay between the received audio signals may be determined, and the direction to the audio source may then be calculated.

This principle has been illustrated in FIG. 1. Two microphones A and B arranged at a distance D receive an acoustic signal from the acoustic source C. The angle $\theta$ of incidence represents the direction between a detection point (the midpoint between microphones A and B) and the source C. A time delay $\tau$ represents the difference between the time of arrival of the acoustic signal at microphones A and B. This time delay is calculated as the maximum point of the cross correlation of the signals provided by microphones A and B, respectively. Herein, "maximum point" refers to the argument, i.e. the time, corresponding to the maximum value of the cross correlation of the microphone signals.

The angle $\theta$ is then calculated as $$\theta = \arcsin\left[\frac{c \times \tau}{D}\right]$$

wherein c is the sound velocity, $\tau$ is the calculated time delay, and D is the distance between the microphones.

The above-mentioned background art approach has certain drawbacks. In particular, noise generated by the microphones themselves has proven to have adverse effect on the resulting angle determination. Hence, it has been necessary to use expensive, high quality microphones in order to obtain a sufficiently accurate and reliable determination of the direction between the detecting point and the active speaker.

SUMMARY

A first exemplary embodiment described herein is a method including: receiving acoustic signals originating from an acoustic source at a first pair of microphone elements, arranged symmetrically about a detection point; calculating, with a processor device, a cross correlation of signals provided by the first pair of microphone elements, resulting in a first cross correlation signal; receiving the acoustic signals originating from the acoustic source at a second pair of microphone elements, arranged symmetrically about the detection point; calculating, with the processor device, a cross correlation of signals provided by the second pair of microphone elements, resulting in a second cross correlation signal; and calculating, with the processor device, a direction between the detection point and the acoustic source based on a convolution of the first cross correlation signal by the second cross correlation signal.

A second exemplary embodiment described herein is a system including: a processor device; a first pair of microphone elements, arranged symmetrically about a detection point, that receive acoustic signals originating from an acoustic source; a first cross correlator, configured to calculate, with the processor device, a cross correlation of signals provided by the first pair of microphone elements, resulting in a first cross correlation signal; a second pair of microphone elements, arranged symmetrically about the detection point, that receive acoustic signals originating from the acoustic source; a second cross correlator, configured to calculate, with the processor device, a cross correlation of signals provided by the second pair of microphone elements, resulting in a second cross correlation signal; a convolver configured to convolve the first cross correlation signal by the second cross correlation signal; and a direction calculator, configured to calculate, with the processor device, a direction between the detection point and the acoustic source based on the convolution of the first cross correlation signal by the second cross correlation signal.

A third exemplary embodiment described here in pertains to a non-transitory computer readable storage medium encoded with instructions, which when executed by a processor causes the processor to execute a method including: receiving acoustic signals originating from an acoustic source at a first pair of microphone elements, arranged symmetrically about a detection point; calculating a cross correlation of signals provided by the first pair of microphone elements, resulting in a first cross correlation signal; receiving the acoustic signals originating from the acoustic source at a second pair of microphone elements, arranged symmetrically about the detection point; calculating a cross correlation of signals provided by the second pair of microphone elements, resulting in a second cross correlation signal; and calculating a direction between the detection point and the acoustic source based on a convolution of the first cross correlation signal by the second cross correlation signal.

BRIEF DESCRIPTION OF THE DRAWINGS

A more complete appreciation of the present technological advancement and its advantages will be readily obtained and understood when studying the following detailed description and the accompanying drawings. However, the detailed description and the accompanying drawings should not be construed as limiting the present technological advancement.

DETAILED DESCRIPTION

In the following, the present technological advancement will be discussed by describing preferred embodiments with reference to the accompanying drawings. However, those skilled in the art will realize that other applications and modifications exist within the scope of the invention as defined by the claims.

Figure 1:
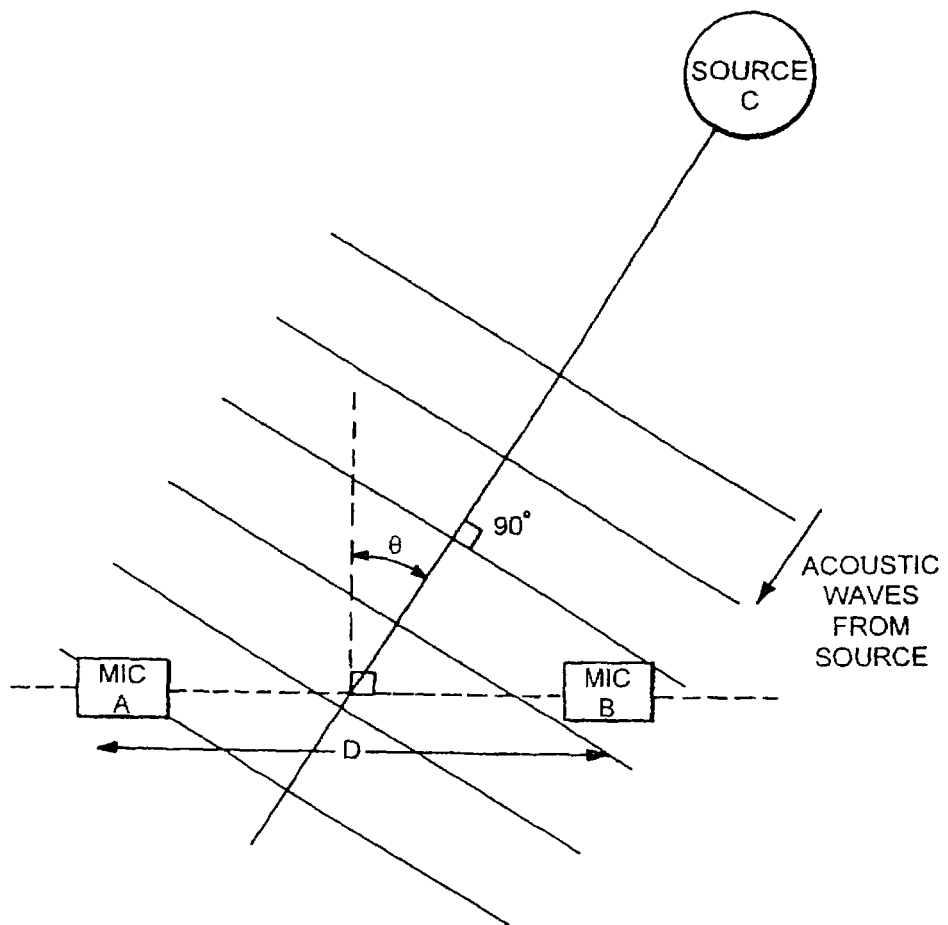
FIG. 1 is a schematic diagram illustrating a principle of direction determining in the background art.

FIG. 1 has already been referred to in the Background section above.

Figure 2:
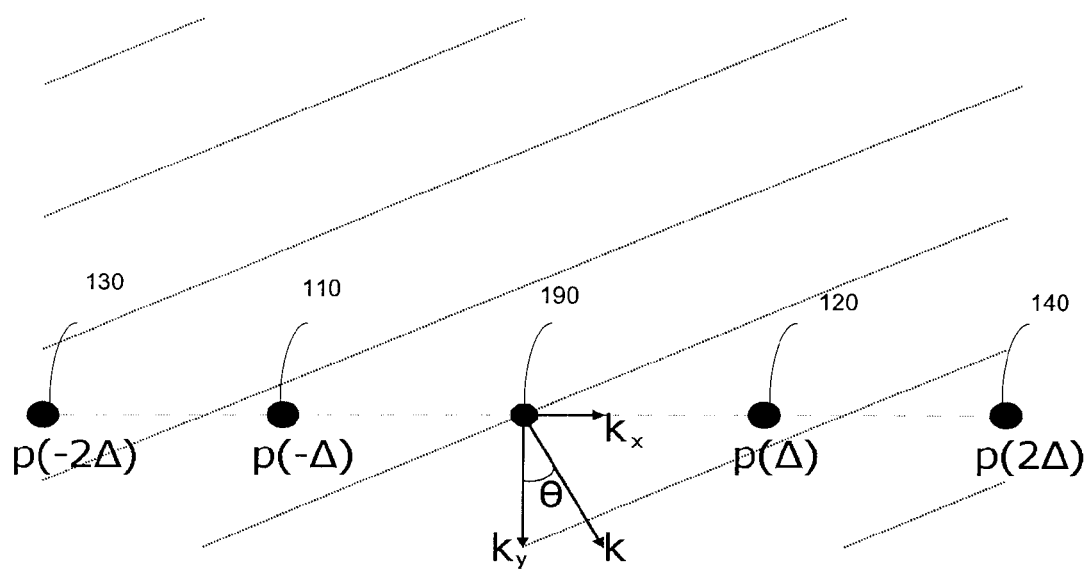
FIG. 2 is a schematic diagram illustrating certain aspects of a method and a system for determining a direction between a detection point and an acoustic source.

FIG. 2 is a schematic diagram illustrating certain aspects of a method and a system for determining a direction between a detection point and an acoustic source.

In FIG. 2, it is assumed that an acoustic plane wave, originating from the acoustic source, impinges on a linear microphone array that is symmetrical about a central detection point 190. Thus, the microphone array includes a number of microphone elements which are arranged in-line, and the distance from the detection point to any of the microphone elements on one flank of the array is the same as the distance to a corresponding microphone element on the other flank. For explanation, four microphone elements have been illustrated: a first pair of microphone elements 110, 120, and a second pair of microphone elements 130, 140. Furthermore, for explanation, a Cartesian coordinate system is organized so that the microphone array and the position of the plane wave source span the x-y plane, and origin, corresponding to the detection point, is positioned in the centre of the microphone array.

In this example, in more general terms, there are M pairs of microphone elements in the microphone array, i.e., the total number of microphone elements is 2M.

The position of the i'th microphone is $x_i$, $$i \in \{-M; -(M-1), \ldots (M-1), M\}.$$

In the example illustration of FIG. 2, M=2, i.e., there are 4 microphone elements in the microphone array. Further, in FIG. 2, $x_i = i\Delta$ and M=2. However, M could assume any integer number 2, 3, 4, 5 or higher.

A mathematical deduction of the angle of arrival, $\theta$, which is an expression of the direction between the detection point 190 and the acoustic source, will be presented in the following.

The sound pressure at the i'th microphone, at time t, is given by $$p(t, i) = s\left(t - \frac{x_i \sin(\theta)}{c}\right) * a_i(t, \theta) + n_i(t) \qquad (1)$$

where s(t) is the time-dependent source acoustic signal, c is the speed of sound in the medium between the source and the microphones, usually air, $\alpha_i(t, \theta)$ is the angular dependent impulse response of the i'th microphone, $n_i(t)$ is the i'th microphone's self noise, and * denotes the convolution operator.

Assume now that the time is considered at discrete points rather than as a continuous variable, and that that the microphone signals have been discretized (and possibly quantized, i.e., analog-digital-converted) at a sampling frequency $1/T_S$.

Further assuming, for simplicity of explanation, that the impulse response of each microphone equals the dirac delta function, i.e., that $\alpha(t, \theta) = \delta(t)$ leads to the following expression of the sound pressure at the i'th microphone:

$$p(n, i) = s\left(\left[n - \frac{x_i \sin(\theta)}{T_s c}\right] T_s\right) + n_i(nT_s) \qquad (2)$$

Performing the Fourier transform leads to the following expression $$P(\omega, i) = S(\omega) e^{-jk_x x_i} + N_i(\omega) \qquad (3)$$

where $\omega = 2\pi f T_s$ and $$k_x = k \sin\theta = \frac{\omega \sin\theta}{c},$$

c being the speed of sound.

Now, the direction between the direction point and the acoustic source, i.e., the angle of arrival, can be estimated, that is, by determining $\theta$.

Complex conjugating the Fourier domain microphone signals in the negative x-plane (corresponding to utilizing the negative frequency components if s is real) and multiplying the signals by the remaining Fourier domain microphone signals in the positive x-plane leads to the array cross spectrum $$S_x(\omega, \theta) = \prod_{i=1}^{M} P(\omega, -i)^* P(\omega, i) \approx S(\omega)^{2M} e^{-j2k_x \sum_{i=1}^{M} x_i} + \sum_{i=1}^{M} |N_i|^2(\omega) \qquad (4)$$

given that the microphone noise signals and sound source are uncorrelated (which is a reasonable assumption).

One can easily see that there will be an increased signal to noise ratio when the number of microphones increases. Calculating the inverse Fourier transform results in $$R_x(n) = \frac{1}{2\pi}\int_{-\pi}^{\pi} S_x(\omega, \theta)e^{j\omega n}d\omega \qquad (5)$$

$$= R_{s2M}\left(\left[n - \frac{2\sin(\theta)\sum_{i=1}^{M} x_i}{T_s c}\right]T_s\right) + \sum_{i=1}^{M} \sigma_i^2 \delta(n).$$

$R_{s2M}$ is the autocorrelation function of the source convolved with itself M times.

The angle θ of arrival can be found by locating a position of the maximum of Rx $$\theta = \arcsin\left(\frac{cT_s}{2\sum_{i=1}^{M} x_i}[\mathrm{argmax}_n R_x(n)]\right). \qquad (6)$$

For the array configuration wherein M=2, i.e., in the case of two pairs of microphones, the maximum can be found by $$\theta = \arcsin\left(\frac{cT_s}{6\Delta}[\mathrm{argmax}_n R_x(n)]\right). \qquad (7)$$

The above reasoning is basically related to the configuration of microphones as schematically illustrated in FIG. 2. However, it should be understood that the above teachings, principles, deductions and assumptions may also be applied, individually or in combination as appropriate, when reading the following disclosure of embodiments of the method and system.

Figure 3:
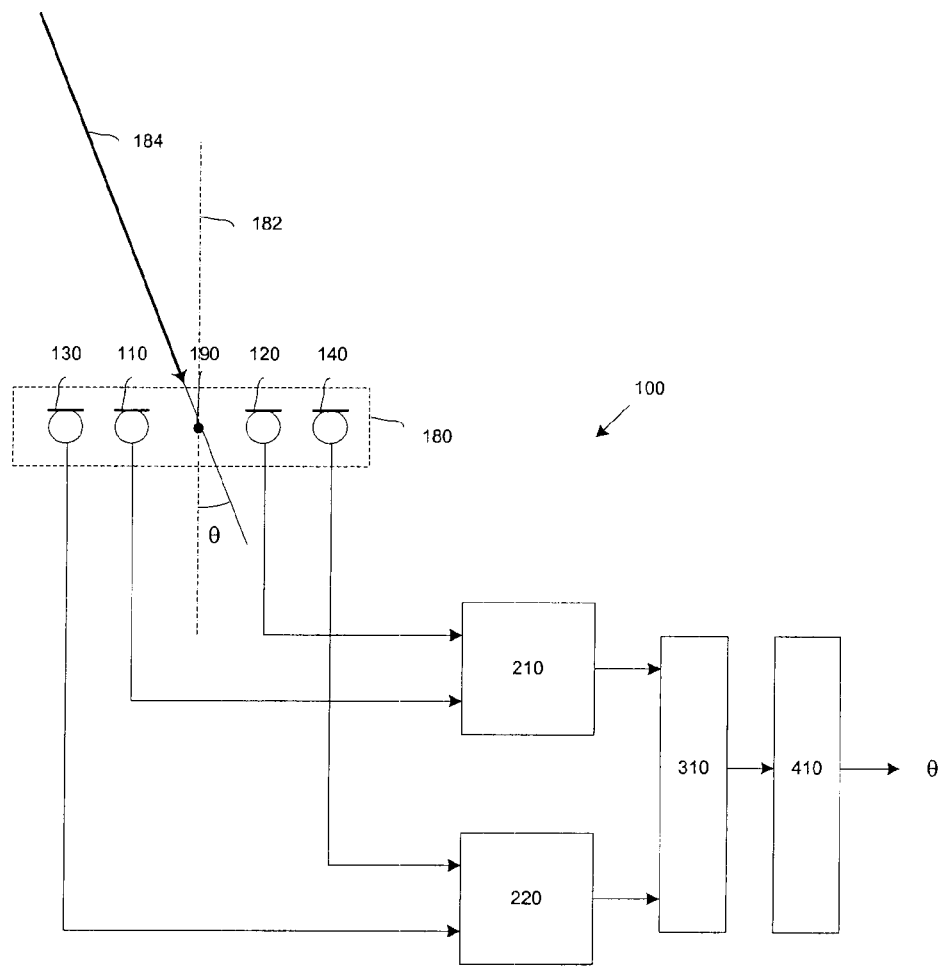
FIG. 3 is a schematic block diagram illustrating principles of a first embodiment of a system for determining a direction between a detection point and an acoustic source.

FIG. 3 is a schematic block diagram illustrating principles of a first embodiment of a system 100 for determining a direction θ between a detection point 190 and an acoustic source.

The acoustic source has not been illustrated. However, the line of incidence 184 illustrates the direction of the incoming acoustic waves, originating from the source. It is assumed that the distance between the acoustic source and the detection point 190 is so much larger than any distance between microphones so that it is reasonable to consider the angle of incidence θ to be the same for all the microphone elements.

The system comprises a first pair of microphone elements 110, 120, arranged symmetrically about the detection point 190, receiving acoustic signals originating from the acoustic source.

The system further comprises a second pair of microphone elements 130, 140, arranged symmetrically about the detection point 190, also receiving acoustic signals originating from the acoustic source.

In the illustrated embodiment, the first (110, 120) and second (130, 140) pairs of microphone elements are arranged in a linear microphone array 180, located at the detection point 190. More specifically, as will also be understood from the illustration in FIG. 3, the microphone array 180 may be arranged in such a way that the microphone elements are located pairwise symmetrically about the axis of incidence 182 passing through the detection point.

As illustrated, the first (110, 120) pair of microphone elements may be an inner pair of microphone elements, i.e., they are arranged closest to the detection point 190. Further, the second (130, 140) pair of microphone elements may be an outer pair of microphone elements, i.e., they are arranged at a larger distance from the detection point 190.

Each microphone element in the first pair of microphone elements is communicatively connected to a respective input of a first cross correlator 210, which is configured to calculate a cross correlation of the two input microphone signals. As a result, the first cross correlator 210 outputs a first cross correlation signal.

Each microphone element in the second pair of microphone elements is communicatively connected to a respective input of a second cross correlator 220, which is configured to calculate a cross correlation of the two input microphone signals. As a result, the second cross correlator 220 outputs a second cross correlation signal.

The expression "communicatively connected" has been used in order to emphasize that there may, or may not, be arranged intermediary circuits, processing elements etc. between the microphones and the remaining circuitry shown on FIG. 3. Such intermediary circuits may, e.g., include any number of elements selected from amplifiers, filters, discretizers, quantizers, samplers, A/D-converters, signal processors, etc.

The first and second cross correlation signals are fed to respective inputs of a convolver 310, followed by a direction calculator 410. The convolver 310 and the direction calculator 410 are configured to calculate the direction between the detection point and the acoustic source based on the first cross correlation signal and the second cross correlation signal.

More specifically, the convolver 310 is configured to convolve the first cross correlation signal by the second cross correlation signal. A convolution is an integral that expresses the amount of overlap of one function as it is shifted over another function. It therefore "blends" one function with another. a convolution is defined as a product of functions $f$ and g that are objects in the algebra of Schwartz functions in $\mathbb{R}$. Convolution of two functions $f$ and g over a finite range [0,t] is given by $$[f*g](t) = \int_{t_0} f(\tau)g(t-\tau)d\tau, \qquad (8)$$

where the symbol $[f*g](t)$ denotes convolution of $f$ and g.

Even more specifically, in an exemplary embodiment, the convolver 310 is configured to perform the convolving of the first cross correlation signal by the second cross correlation signal in a frequency domain. Alternatively, the convolver may be configured to perform the convolving in a time domain.

The direction calculator 410 is configured to calculate the direction between the detection point and the acoustic source by identifying a maximum point of the result of the convolving.

More specifically, the direction calculator 410 may be configured to calculate an angle of incidence, representing the direction between the detection point and the acoustic source, based on the identified maximum point.

The elements denoted as cross correlator(s), convolver(s) and direction calculator have been described as separate functional modules for the purpose of explanation of the principles of the present technological advancement. The skilled person will realize that such functional modules may be implemented as processing instructions in software. In this case the cross correlators, the convolver and the direction calculator may be software modules, controlling a processing device which receives the input signals, processes them according to the present disclosure, and calculates a value representing the desired direction or angle as an output signal.

The processing instructions may be held in memory or a storage device. In particular, the functional modules, and/or other parts of the functionality provided by the exemplary embodiments, may be implemented by a digital signal processor.

As one of ordinary skill in the art would recognize, the processing device or digital signal processor may be implemented as discrete logic gates, as an Application Specific Integrated Circuit (ASIC), a Field Programmable Gate Array (FPGA) or other Complex Programmable Logic Device (CPLD). Further, the memory may be non-volatile, such as ROM, EPROM, EEPROM or FLASH memory. The electronic memory may also be volatile, such as static or dynamic RAM, and the processing device, such as a microcontroller or microprocessor, may manage the electronic memory as well as the interaction between the FPGA or CPLD and the electronic memory.

The processing device may execute a set of computer-readable instructions stored in any of the above-described electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art.

An embodiment of the system has particular utilization in video conferencing. In such an embodiment, the acoustic source may be an active participant in a video conference, i.e., an active speaker in the conference. Further, the detection point coincides wholly or substantially with a location of a variable-direction video camera in a video conference equipment, such as a video conference endpoint. The system may further include a camera controller, which is configured to control the camera, in particular its rotation about a substantially vertical and/or horizontal axis, to make it point in the direction calculated by the method and system disclosed herein (i.e., make the camera point towards the acoustic source, which may be the active conference participant). This may result in the camera capturing an image of the active participant. In order to improve the capturing of the active participant's image, zooming may be used to select the proper detail of the image.

Figure 4:
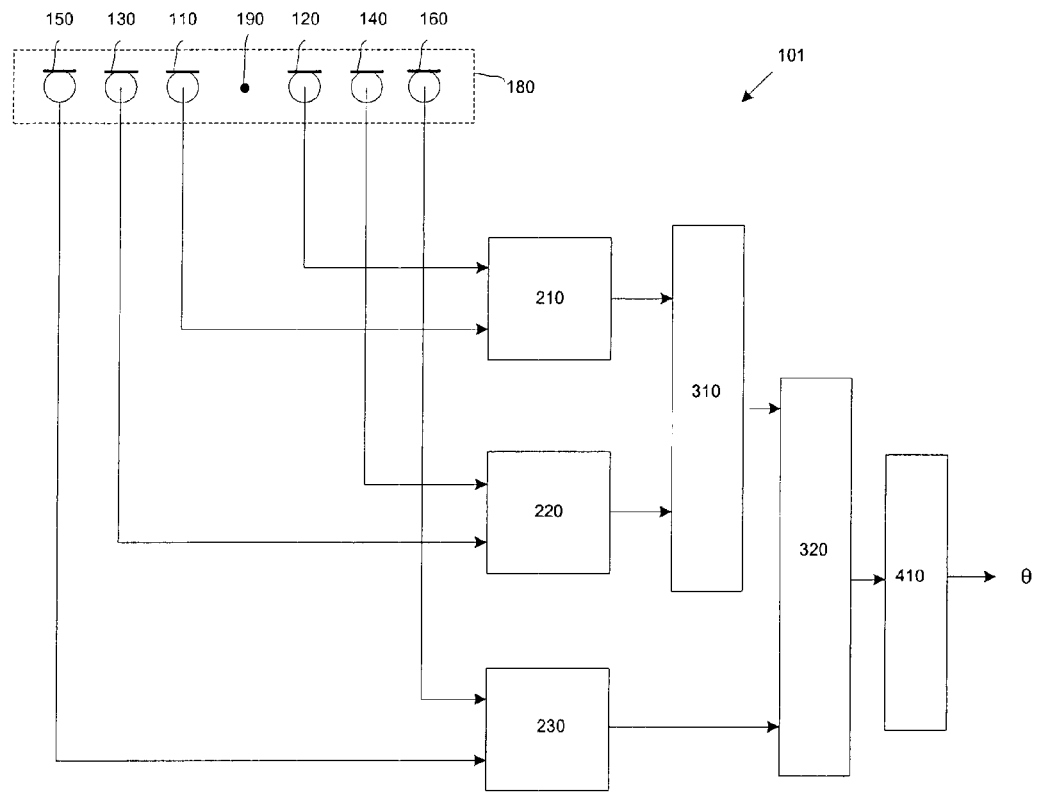
FIG. 4 is a schematic block diagram illustrating principles of a second embodiment of a system for determining a direction between a detection point and an acoustic source.

FIG. 4 is a schematic block diagram illustrating principles of a second embodiment of a system 101 for determining a direction between a detection point 190 and an acoustic source.

The system 101 illustrated in FIG. 4 corresponds to the system 100 illustrated in FIG. 3, and the same reference numerals have been used for illustrating identical or corresponding elements.

However, the system 101 illustrated in FIG. 4 further comprises a third pair (150, 160) of microphone elements, which are arranged pairwise symmetrically about the detection point 190, and which receive acoustic signals originating from the acoustic source (not shown).

Further, the system 101 includes a third cross correlator 230, configured to calculate a cross correlation of signals provided by the third pair 150, 160 of microphone elements, resulting in a third cross correlation signal.

Further, in system 101, the convolver 310, in this example referred to as a first convolver 310, a second convolver 320, and the direction calculator 410 are configured to calculate the direction between the detection point and the acoustic source based on the first, second and third cross correlation signals.

More specifically, the first convolver 310 is configured to calculate the convolution of the first and second cross correlation signals. The result of this convolution, referred to as a first convolved signal, is fed as a first input to the second convolver 320. The third cross correlation signal is fed as a second input to the second convolver 320. The output of the second convolver 320 is fed as input to the direction calculator 410, which is configured to calculate the direction between the detection point and the acoustic source by identifying a maximum point of the result of the output of the second convolver.

It will be understood that it is possible, and within the scope of the present technological advancement, to re-use the principle of adding another pair of microphone elements in the linear microphone array, and adding further cross correlators which calculate the cross correlation of the added pair of microphone elements, and modifying the arrangement of convolvers and the direction calculator in order to calculate the output signal indicating the value of the direction or angle of incidence, based also on the output of the further cross correlators.

Thus, in the case of M pairs of microphone elements, wherein M is an integer greater than 2, the M pairs of microphone elements are arranged pairwise symmetrically about the detection point, receiving acoustic signals originating from the acoustic source. The system then also includes M cross correlators, referred to as the first, second, . . . and so on up to the M-th cross correlator. Each cross correlator is configured to calculate a cross correlation of signals provided by the respective pair of microphone elements, resulting in M cross correlation signals.

Further, M−1 convolvers are arranged in the system. The first convolver is configured to calculate the convolution of the first and second cross correlation signals, resulting in a first convolved signal. The second convolver is configured to calculate the convolution of the first convolved signal and the third cross correlation signal, and so on. The (M−1)-th convolver is arranged to calculate the convolution of the (M−2)-th convolved signal and the M-th cross correlation signal.

Further, still in the case of M pairs of microphone elements, the direction calculator 410 is configured to calculate the direction between the detection point and the acoustic source based also on the M-th cross correlation. More specifically, the direction calculator is configured to calculate the direction between the detection point and the acoustic source based on the output of the (M−1)-th convolver, as specified above.

Figure 5:
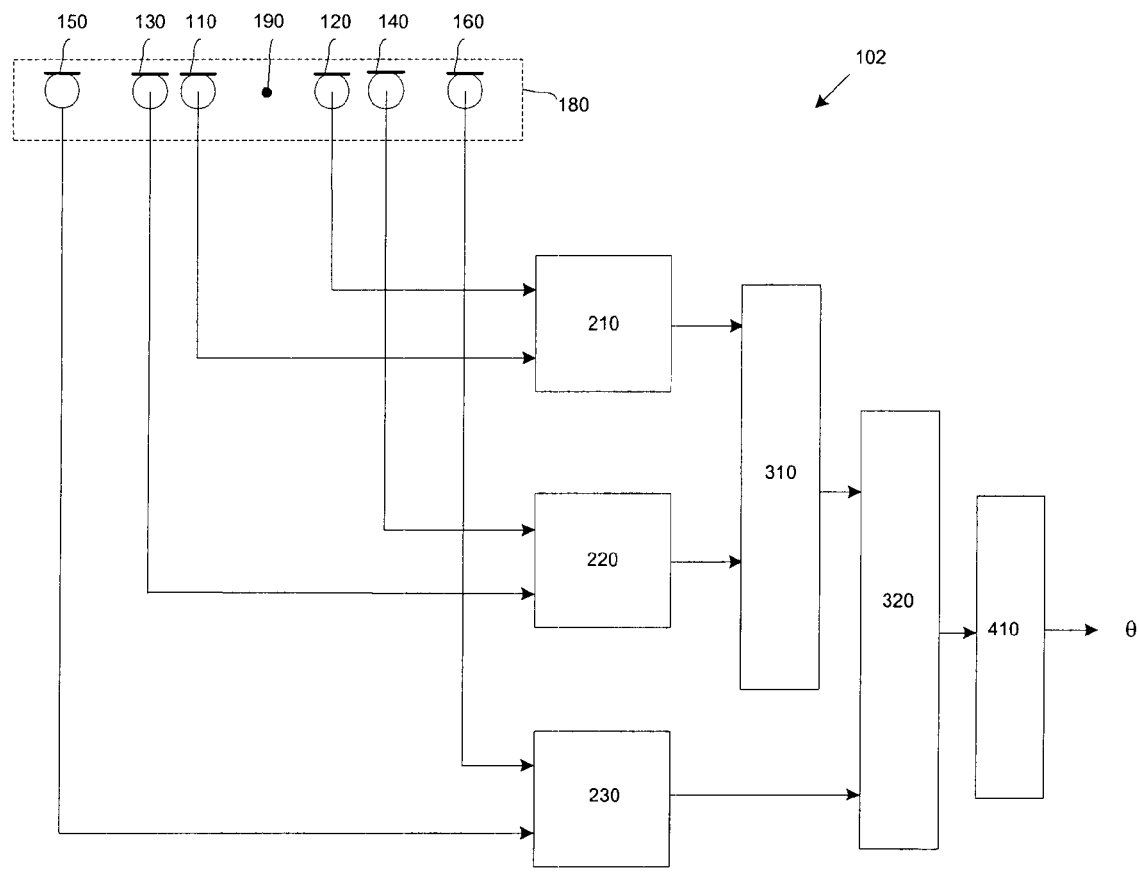
FIG. 5 is a schematic block diagram illustrating principles of a third embodiment of a system for determining a direction between a detection point and an acoustic source.

FIG. 5 is a schematic block diagram illustrating principles of a third embodiment of a system 102 for determining a direction between a detection point 190 and an acoustic source.

The system 102 corresponds substantially to the system 101 illustrated in FIG. 4, and the same reference numerals are used for identical or corresponding elements on the figures. However, in FIG. 5 it has been indicated that the distance between adjacent microphones is not necessarily the same, as long as each pair of microphone elements is arranged in-line and symmetrically about the detection point 190 (or symmetrically about the axis of incidence crossing the detection point 190). For instance, the distance between microphone elements 110 and 130 (which equals the distance between microphone elements 120 and 140) may be less than the distance between the microphone elements 130 and 150

(which equals the distance between the microphone elements 140 and 160). Other possibilities exist as well, as will be realized by the skilled person.

Figure 6:
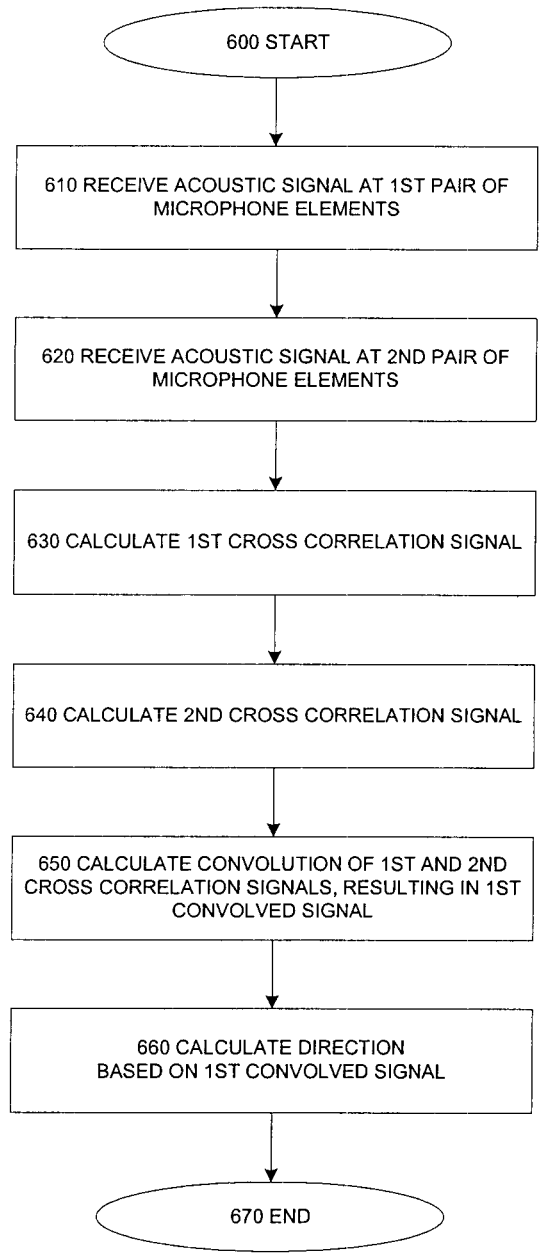
FIG. 6 is a schematic flow chart illustrating principles of a first embodiment of a method for determining a direction between a detection point and an acoustic source.

FIG. 6 is a schematic flow chart illustrating principles of a first embodiment of a method for determining a direction between a detection point and an acoustic source.

The method starts at the initial step 600.

In the first receiving step 610, acoustic signals originating from the acoustic source are received at a first pair of microphone elements, which are arranged symmetrically about the detection point.

The first and second pairs of microphone elements may be arranged in-line, in a linear microphone array located at the detection point, in such a way that the microphone elements are located pairwise symmetrically about an axis of incidence that passes through the detection point.

The first pair of microphone element may be an inner pair of microphone elements, and the second pair of microphone elements may be an outer pair of microphone elements.

Next, in the second receiving step 620, acoustic signals originating from the acoustic source are received at a second pair of microphone elements, which also are arranged symmetrically about the detection point.

Next, in the first cross correlation signal calculating step 630, a first cross correlation signal is calculated as the cross correlation of the signals provided by the first pair of microphone elements.

Next, in the second cross correlation signal calculating step 640, a second cross correlation signal is calculated as the cross correlation of the signals provided by the second pair of microphone elements.

Cross correlation signals may conveniently be calculated in frequency domain, by first calculating a Fourier transform of each microphone signal, and by multiplying the Fourier representation of one microphone signal with the complex conjugated Fourier representation of the other microphone signal in the microphone pair. Calculating the inverse Fourier transform of this product yields the time domain cross correlation of the microphone signals.

Alternatively, the cross correlation signal may be calculated in time domain, by convolving one microphone signal with a time reversed signal provided by the other microphone in the microphone pair.

Next, in the convolution calculating step 650, the convolution of the first cross correlation signal and the second cross correlation signal is calculated, resulting in a first convolved signal.

Such a convolving of the first cross correlation signal by the second cross correlation signal may be performed in a frequency domain. More specifically, if the cross correlation signal has been provided by a Fourier transform, the convolution may conveniently be performed in the Fourier domain (frequency domain) by multiplication, followed by inverse Fourier transforming of the result. Alternatively, the convolving may be performed in a time domain.

Next, in the direction calculating step 660, the direction between the detection point and the acoustic source is calculated, based on the first cross correlation signal and the second cross correlation signal. More specifically, the direction is calculated based on the first convolved signal resulting from step 650.

The direction calculating step 660 may, in an embodiment, include identifying a maximum point of the first convolved signal. The maximum point represents the argument, i.e. the time, corresponding to the maximum value of the first convolved signal. Identifying the maximum point may be performed by a search approach.

More specifically, in the direction calculating step 660, an angle of incidence, which represents the direction between the detection point and the acoustic source, may be calculated based on the identified maximum point.

Further details about the method, in particular further aspects of calculating the angle, i.e., the direction to the acoustic source, have been disclosed above with reference to FIG. 2.

It will be understood that the illustrated sequence of steps in FIG. 6 has been presented for explanatory purposes, and that the same result may be achieved with a sequence that departs from what has been illustrated. For instance, the steps 610 and 620 of receiving acoustic signals may be performed simultaneously or concurrently. If the receiving steps are performed at distinct point of times, the time difference between them should be kept small compared to the nature of the acoustic signals in question. In this case, the sequence of the receiving at the first and the second pair of microphone elements may be interchanged. Likewise, it will be understood that the calculating of first and second cross correlation signals may be performed in any order, or simultaneously or concurrently, if desired.

Figure 7:
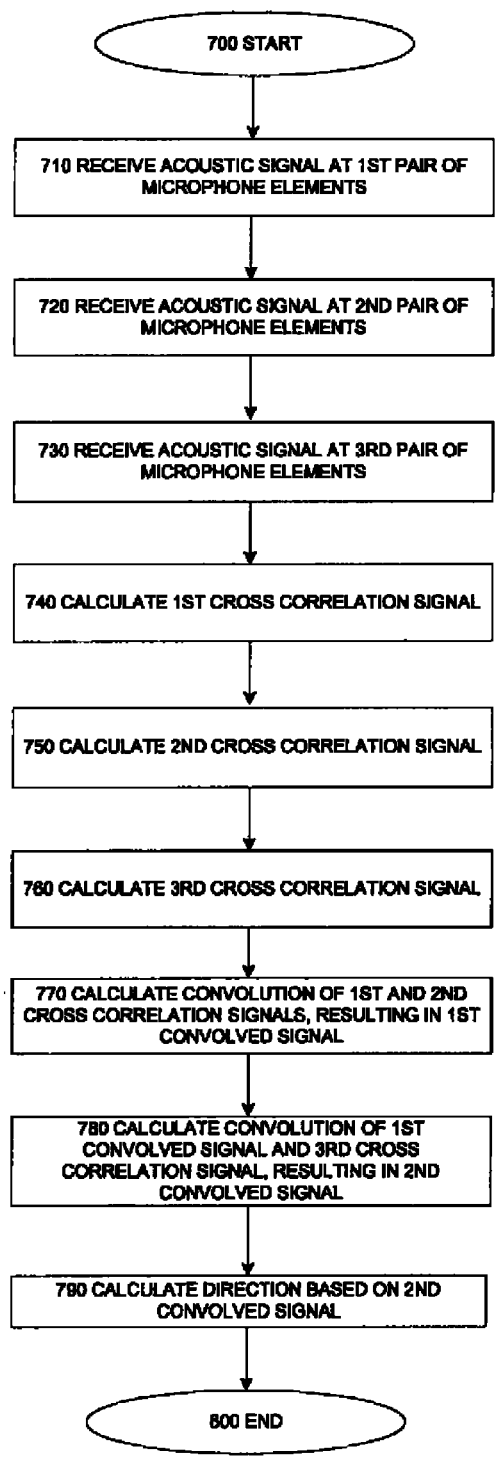
FIG. 7 is a schematic flow chart illustrating principles of a second embodiment of a method for determining a direction between a detection point and an acoustic source.

FIG. 7 is a schematic flow chart illustrating principles of a method for determining a direction between a detection point and an acoustic source, using first, second and third pairs of microphone elements.

The first, second and third pairs of microphone elements may be arranged in-line, in a linear microphone array located at the detection point, in such a way that the microphone elements are located pairwise symmetrically about an axis of incidence that passes through the detection point, for example, in the manner as described above with reference to FIG. 4 or 5.

The method starts at the initial step 700.

In the first receiving step 710, acoustic signals originating from the acoustic source are received at the first pair of microphone elements.

Next, in the second receiving step 720, acoustic signals originating from the acoustic source are received at the second pair of microphone elements.

Next, in the second receiving step 730, acoustic signals originating from the acoustic source are received at the third pair of microphone elements.

Next, in the first cross correlation signal calculating step 740, a first cross correlation signal is calculated as the cross correlation of the signals provided by the first pair of microphone elements.

Next, in the second cross correlation signal calculating step 750, a second cross correlation signal is calculated as the cross correlation of the signals provided by the second pair of microphone elements.

Next, in the third cross correlation signal calculating step 760, a third cross correlation signal is calculated as the cross correlation of the signals provided by the third pair of microphone elements.

Cross correlation signals may conveniently be calculated in frequency domain or in the time domain, for example, as described above with reference to FIG. 3, 4, 5, or 6.

Next, in the first convolution calculating step 770, the convolution of the first cross correlation signal and the second cross correlation signal are calculated, resulting in a first convolved signal.

Next, in the second convolution calculating step 780, the convolution of the first convolved signal and the third cross correlation signal is calculated, resulting in a second convolved signal.

The calculating of convolved signals may be performed in frequency domain or in the time domain, for example, as described above with reference to FIG. 3, 4, 5, or 6.

Next, in the direction calculating step 790, the direction between the detection point and the acoustic source is calculated, based on the first cross correlation signal, the second cross correlation signal and the third cross correlation signal. More specifically, the direction is calculated based on the second convolved signal resulting from step 780.

The direction calculating step 790 may, in a corresponding manner as described with reference to FIG. 6, include identifying a maximum point of the second convolved signal.

In still another embodiment of the method, acoustic signals originating from the acoustic source are received at M pairs of microphone elements which are arranged pairwise symmetrically about the detection point, wherein M is an integer greater than two. The integer M may, e.g., be 3, 4, or 5. Alternatively, M may be another integer, greater than 5. The cross correlation of signals provided by each pair of microphone elements are calculated, resulting in M cross correlation signals. Further, the step of calculating the direction between the detection point and the acoustic source is based on the M cross correlation signals.

In such a case the method includes M steps of calculating cross correlation signals, each step corresponding to a respective pair of microphones. Such steps may be referred to as the first, second, . . . and so on, up to the M-th step of calculating cross correlation signals. The M steps of calculating correlation signal results in M cross correlation signals.

Further, M−1 steps of calculating convolution are included in the method. The first step of calculating convolution calculates the convolution of the first and second cross correlation signals, resulting in a first convolved signal. The second step of calculation convolution calculates the convolution of the first convolved signal and the third cross correlation signal, and so on. Finally, the (M−1)-th step of calculating convolution calculates the convolution of the (M−2)-th convolved signal and the M-th cross correlation signal.

Further, still in the case of M pairs of microphone elements, a step of calculating a direction calculates the direction between the detection point and the acoustic source based also on the M cross correlation signals. More specifically, the direction may be calculated based on the output of the (M−1)-th convolving step, as specified above.

Thus, the convolving procedure may be used for the next outer microphone element pair, recursively, in combination with the already calculated convolved cross correlations of the signals provided by the inner microphone element pairs in the linear, symmetrical microphone array.

In a particularly useful application of the method, the acoustic source is an active participant in a video conference, and the detection point coincides with a location of a variable-direction video camera in a video conference equipment. In this case, the method further comprises controlling the camera to point in the calculated direction for capturing the active participant by the camera.

As described above, the method and system for determining the direction between a detection point and an acoustic source is particularly useful in video conferencing, e.g., for automatic camera pointing towards an active participant (a speaker) in a video conferencing system. However, the determining of direction between a detection point and an acoustic source may be used in several other applications as well, e.g., in the production of TV programs or movies, in stage settings in theatrical shows or during music performance, and in surveillance, monitoring or security technology.

The exemplary embodiments discussed above result in a higher signal to noise ratio, compared to the conventional time delay technique for angle of arrival estimation referred to in the Background section. Thus, the exemplary embodiments may provide for cheaper microphones with higher noise levels, without sacrificing overall performance and accuracy. Alternatively, the use of high quality microphones with the principles of the present technological advancement may allow for better performance and accuracy in the determination of arrival direction, also in cases where the source has a weak output signal, or if the source is located at a substantial distance from the detection point.

It should be understood that the described method and system are completely corresponding, and that any feature that may have been described specifically for the method, should be considered as also being disclosed with its counterpart in the description of the system, and vice versa.

Numerous modifications and variations of the present technological advancement are possible in light of the above teachings. It is therefore to be understood that within the scope of the appended claims, the present technological advancement may be practiced otherwise than as specifically described herein.

The invention claimed is:

1. A method comprising:
receiving acoustic signals originating from an acoustic source at a first pair of microphone elements, arranged symmetrically about a detection point;
calculating, with a processor device, a cross correlation of signals provided by the first pair of microphone elements, resulting in a first cross correlation signal;
receiving the acoustic signals originating from the acoustic source at a second pair of microphone elements, arranged symmetrically about the detection point;
calculating, with the processor device, a cross correlation of signals provided by the second pair of microphone elements, resulting in a second cross correlation signal; and
calculating, with the processor device, a direction between the detection point and the acoustic source based on a convolution of the first cross correlation signal by the second cross correlation signal.

2. The method according to claim 1, wherein the convolving the first cross correlation signal by the second cross correlation signal is performed in a frequency domain.

3. The method according to claim 1, wherein the calculating the direction between the detection point and the acoustic source comprises:
identifying a maximum point of the result of the convolving.

4. The method according to claim 3, further comprising:
calculating an angle of incidence, representing the direction between the detection point and the acoustic source, based on the maximum point.

5. The method according to claim 1, wherein the first and second pairs of microphone elements are arranged in a linear microphone array located at the detection point, and the microphone elements are located symmetrically about an axis of incidence passing through the detection point.

6. The method according to claim 5, wherein the first pair of microphone elements is an inner pair of microphone elements, and the second pair of microphone elements is an outer pair of microphone elements.

7. The method according to claim 1, further comprising:
receiving the acoustic signals originating from the acoustic source at an M-th pair of microphone elements, arranged symmetrically about the detection point;

calculating a cross correlation of signals provided by the M-th pair of microphone elements, resulting in an M-th cross correlation signal; and wherein the calculating the direction between the detection point and the acoustic source is based on the M-th cross correlation signal, and M is an integer greater than 2.

8. The method according to claim 1, wherein the acoustic source is an active participant in a video conference, and the detection point coincides with a location of a variable-direction video camera in a video conference equipment, and the method further comprises:

controlling the camera to point in a direction of the acoustic source.

9. A system comprising:

a processor device;

a first pair of microphone elements, arranged symmetrically about a detection point, that receive acoustic signals originating from an acoustic source;

a first cross correlator configured to calculate, with the processor device, a cross correlation of signals provided by the first pair of microphone elements, resulting in a first cross correlation signal;

a second pair of microphone elements, arranged symmetrically about the detection point, that receive acoustic signals originating from the acoustic source;

a second cross correlator configured to calculate, with the processor device, a cross correlation of signals provided by the second pair of microphone elements, resulting in a second cross correlation signal;

a convolver configured to calculate a first convolution of convolving the first cross correlation signal with the second cross correlation signal; and a direction calculator configured to calculate, with the processor device, a direction between the detection point and the acoustic source based on the first convolution of convolving the first cross correlation signal by the second cross correlation signal.

10. The system according to claim 9, wherein the convolver is configured to convolve the first cross correlation signal by the second cross correlation signal in a frequency domain.

11. The system according to claim 9, wherein the direction calculator is configured to calculate the direction between the detection point and the acoustic source by identifying a maximum point of the output of the convolver.

12. The system according to claim 11, wherein the direction calculator is configured to calculate an angle of incidence, representing the direction between the detection point and the acoustic source, based on the maximum point.

13. The system according to claim 9, wherein the first and second pairs of microphone elements are arranged in a linear microphone array located at the detection point, and the microphone elements are located symmetrically about an axis of incidence passing through the detection point.

14. The system according to claim 13, wherein the first pair of microphone elements is an inner pair of microphone elements, and the second pair of microphone elements is an outer pair of microphone elements.

15. The system according to claim 9, further comprising:

an M-th pair of microphone elements, arranged symmetrically about the detection point, that receive the acoustic signals originating from the acoustic source;

an M-th cross correlator, configured to calculate a cross correlation of signals provided by the M-th pair of microphone elements, resulting in an M-th cross correlation signal; and an arrangement of convolvers, wherein the direction calculator and the arrangement of convolvers are configured to calculate the direction between the detection point and the acoustic source based also on the M-th cross correlation, and M is an integer greater than 2.

16. The system according to claim 9, wherein:

the acoustic source is an active participant in a video conference, and the detection point coincides with a location of a variable-direction video camera in a video conference equipment, and the system further comprises a camera controller configured to control the camera to point in a direction of the acoustic source.

17. A non-transitory computer readable storage medium encoded with instructions, which when executed by a processor causes the processor to execute a method comprising:

receiving acoustic signals originating from an acoustic source at a first pair of microphone elements, arranged symmetrically about a detection point;

calculating a cross correlation of signals provided by the first pair of microphone elements, resulting in a first cross correlation signal;

receiving the acoustic signals originating from the acoustic source at a second pair of microphone elements, arranged symmetrically about the detection point;

calculating a cross correlation of signals provided by the second pair of microphone elements, resulting in a second cross correlation signal; and calculating a direction between the detection point and the acoustic source based on a convolution of the first cross correlation signal by the second cross correlation signal.

18. The system according to claim 14, wherein a distance between the axis of incidence and each of the first pair of microphone elements is different from a distance between each of the second pair of microphone elements and a closest one of the first pair of microphone elements.

19. The system according to claim 13, further comprising:

a third pair of microphone elements, arranged symmetrically about the detection point, that receive acoustic signals originating from the acoustic source, wherein the first, second, and third pair of microphone elements are respectively provided at first, second, and third distances away from the detection point, where the first distance is less than the second distance, and the second distance is less than the third distance.

20. The system according to claim 19, further comprising:

a third cross correlator configured to calculate, with the processor device, a cross correlation of signals provided by the third pair of microphone elements, resulting in a third cross correlation signal; and a second convolver configured to calculate a second convolution of convolving the third cross correlation signal with the first convolution, wherein the direction calculator is configured to calculate, with the processor device, the direction between the detection point and the acoustic source based on the second convolution.

* * * * *